(12) United States Patent
Campbell

(10) Patent No.: US 6,447,586 B1
(45) Date of Patent: Sep. 10, 2002

(54) AIR TREATMENT APPLIANCE WITH A TRANSLUCENT BODY

(75) Inventor: Christopher Paul Campbell, Nashville, TN (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 09/731,427

(22) Filed: Dec. 6, 2000

(51) Int. Cl.$^7$ .............................................. B01D 46/52
(52) U.S. Cl. ............................. 96/415; 96/416; 55/471; 55/472; 55/473; 261/DIG. 65
(58) Field of Search .................. 55/356, 357, 471, 55/490, 497, 503, 511, 472, 473; 96/414, 415, 416; 261/DIG. 65

(56) References Cited

U.S. PATENT DOCUMENTS

| | | | | |
|---|---|---|---|---|
| 4,963,134 A | * | 10/1990 | Backscheider | 96/415 |
| 5,110,330 A | * | 5/1992 | Loughran | 96/45 |
| 5,529,593 A | * | 6/1996 | Simmons | 55/471 |
| 5,753,002 A | * | 5/1998 | Gluckman | 55/471 |
| 5,893,939 A | * | 4/1999 | Rakocy et al. | 55/471 |
| 5,984,991 A | * | 11/1999 | Glucksman | 55/471 |
| 6,017,375 A | * | 1/2000 | Duell et al. | 55/471 |
| 6,030,426 A | * | 2/2000 | Stopyra et al. | |

* cited by examiner

Primary Examiner—David A. Simmons
Assistant Examiner—Minh-Chau T. Pham
(74) Attorney, Agent, or Firm—Robert O. Rice; Stephen D. Krefman; Thomas J. Roth

(57) ABSTRACT

An air treatment appliance having an external body at least partially constructed of a translucent material. An air inlet and an air outlet in the external body permit airflow through the device. A fan inside the body is operable to draw in air through the air inlet and to expel it through the air outlet and the air may be passed through a filter mechanism in the device. At least some components of the interior of the air treatment appliance having a condition capable of visibly changing during an operation of the appliance, such as the filter mechanism and the fan, are visible from the exterior through the translucent material of the external body such that the condition is visible from the exterior of the external body through the translucent material. The translucent material may be clear, colored, or a predetermined combination of colors.

9 Claims, 2 Drawing Sheets

AIR TREATMENT APPLIANCE WITH A TRANSLUCENT BODY

BACKGROUND OF THE INVENTION

Invention relates generally to air treatment appliances such as air purifying devices and, more particularly, to an air treatment appliance with a translucent body for permitting convenient and non-intrusive inspection of the filtering mechanism and other parts within the device.

Air purifying devices are known in the art. The known devices typically include an air inlet for air to be drawn into the device, a fan for drawing in the air, a filtering mechanism to filter out undesirable material from the air drawn in, such as contaminants, dust particles and debris, and an air outlet for expelling the filtered air. The devices typically also contain other associated components, such as electrical switches and electrical or electronic circuitry for controlling and monitoring the operation of the device. Over time, undesirable material filtered out by the filtering mechanism in such devices accumulates in the filtering mechanism, whereby the filtering mechanism gets loaded with undesirable material. Accordingly, the filtering mechanism in these devices must either be cleaned, or sometimes replaced, from time-to-time, in order to remove the accumulated undesirable material. If, however, the filtering mechanism is not cleaned or replaced when necessary, the performance of the device is detrimentally impacted and the quality of the air filtered by the device deteriorates. This can be harmful for a user, particularly for users with health problems who use the device for health reasons. Further, a loaded filtering mechanism puts an excess strain on the fan to draw in air, or the capacity of airflow can get cut down. Therefore, it is important to clean or replace the filtering mechanism in an air purifying device as and when necessary, which requires knowing when the filtering mechanism inside the device needs cleaning or replacement.

Typically, an air purifying device has to be opened in order for one to inspect the filtering mechanism within it. Opening the device, however, first requires the device to at least be switched off, and preferably disconnected from its power source. Further, the opening procedure can be cumbersome and tedious, and restoring the device back to its closed operating position after the inspection can likewise be tedious. Depending upon the difficulty of the task, users tend to procrastinate in performing timely inspections of the filtering mechanism in such devices. This results in delayed cleanings or replacements of the filtering mechanism, which detrimentally impacts the performance of the device and deteriorates the quality of the air filtered by the device.

In order to prevent such problems, some users may tend to clean or replace the filtering mechanism in the devices more frequently than necessary. Others may tend to do so at fixed predetermined time intervals, irrespective of whether the mechanism needs cleaning or replacement or not. Although this helps maintain the performance of the device and the quality of air filtered by it, it results in an unnecessary waste of both time and money.

Known air purifying devices typically also include at least one moving part, which is a fan for drawing in air through the filtering mechanism and expelling it from the device in a predetermined direction. Such moving parts tend to accumulate dust and debris over time due to the high traffic of air that they are exposed to, which may decrease the efficiency of the overall device. Such condition, however, is not readily apparent to a user until the user has had a chance to visually inspect the interior of the device when the device is opened. Typically, however, as discussed above such devices are not opened all that frequently, whereby such condition may continue to exist undetected for some time.

Typically, known air purifying devices include a light indicator or other visual indicator to indicate whether the device is currently in operation. Without having to come in physical contact with the device, a user may thus determine with a quick visual inspection of the indicator whether the device is currently operating. However, providing the light or other visual indicator adds to the cost of manufacturing of the devices, and further the light or other visual indicator consumes power during the entire time of operation of the device.

Other appliances, particularly air treatment appliances such as air conditioners, humidifiers, dehumidifiers, and the like, have similar constructions to those of air purifiers.

There is, therefore, a need for an improved air purifying device or other appliance wherein a user may conveniently inspect the condition of the filtering mechanism and the moving parts within the device, and determine the current operating condition of the device without having to open or switch off the device. Accordingly, this invention is directed to overcoming one or more of the problems set forth above.

SUMMARY OF THE INVENTION

An air purifying device or other air treatment appliance includes a body, an air inlet for permitting air to be drawn into the device, a fan for drawing the air into the device, possibly a filtering mechanism to filter out undesirable material from the air drawn into the device, and an air outlet for permitting the filtered air to be expelled from the device. At least some portions of the body of the device are constructed of a translucent material, thereby facilitating convenient inspection of the filtering mechanism and other parts within the device. The translucent material may be a colorless material, or it may be of an aesthetically appealing color or combination of colors.

DETAILED DESCRIPTION OF THE PREFERRED EMBODIMENTS

The present invention is useful in a wide variety of appliances, particularly air treatment appliances with one or more internal components which have a condition capable of visibly changing during operation of the appliance. One such appliance in which the invention finds utility is an air purifying device. It is this appliance in which the invention will be described, although it should be understood that the invention is not limited to this particular appliance.

Figure 1:
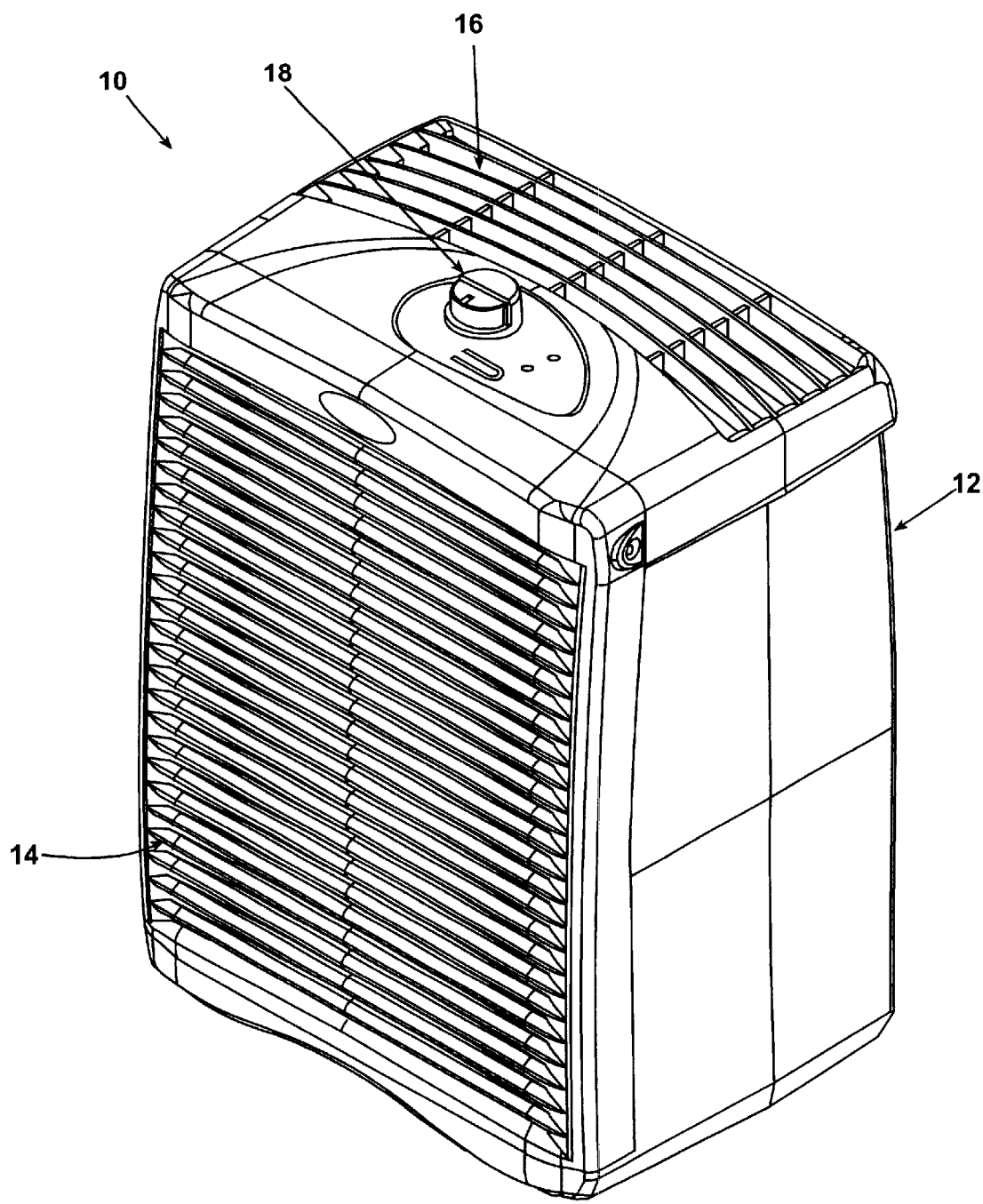
FIG. 1 is a front perspective view of the exterior of an air purifying device according to one embodiment of the present invention.

Referring to FIG. 1, the exterior of an air purifying device 10 from the front according to one embodiment of the present invention is shown. The device 10 includes an exterior body 12 which houses the internal components (discussed below) of the device 10. The body 12 will usually be comprised of two or more pieces operatively connected together, which pieces may be disconnected from each other or removed to disassemble the device. The pieces of the body 12 may be operatively connected together in any manner known in the art, such as by screws, by snapping together corresponding portions integrally constructed in the pieces of the body 12, and the like. The body 12 will typically also include other functional features such as an air inlet means 14 and an air outlet means 16 which are discussed in greater detail below.

The device 10 also includes an electrical control means 18, such as an electrical switch, a control knob, or the like, for at least partially controlling the operation of the device. The particulars of the electrical control means 18 are not critical for the purposes of the present invention, and therefore it is recognized and anticipated that any electrical or electronic control apparatus known in the art that is usable with air purifying devices may be used in the device 10. In other embodiments, it is recognized that the electrical control means 18 may be eliminated altogether. However, it is anticipated that the electrical control means 18 will typically include at least a power switch for switching the device 10 on or off. The electrical control means 18 may, although, also include additional components such as a user selectable speed control mechanism for selectively controlling the speed of operation of the device 10, a corresponding visual indicator such as a light or an LED indicative of the selected speed of operation, and the like. Accordingly, all such variations and embodiments of the electrical control means 18 are recognized and anticipated, and therefore it is intended that the claims shall cover all such embodiments that do not depart from the spirit and scope of the present invention.

Air inlet means 14 typically provides an inlet for the surrounding air to be drawn into the air purifying device 10. In this regard, the air inlet means 14 will provide an opening in the body 12. Typically, the air inlet means 14 will include a grille or fins with openings in between of a predetermined width. The grille or fins serve to prevent any large objects from being undesirably drawn into the device 10 along with the air being drawn in, which may damage the device or inflict injury upon a person or a pet, etc. In other embodiments, however, the device 10 may have a wire mesh or wider-sectioned openings to serve as the air inlet means 14. The air inlet means 14 may also comprise a series of spaced openings through an otherwise planar or curved surface of the body 12. Accordingly, all such embodiments are recognized and anticipated.

Similarly, the body 10 includes an air outlet means 16 for expelling the air that is drawn into the device through the air inlet means 14, whereby the air outlet means 16 will also provide an opening in the body 12. In this regard, the air outlet means 16 will typically be spaced apart from the air inlet means 14. Typically, the air outlet means 16 will also include a grille or fins with openings in between of a predetermined width. In other embodiments, however, the device 10 may have a wire mesh or wider-sectioned openings to serve as the air outlet means 16. The air outlet means 16 may also comprise a series of spaced openings through an otherwise planar or curved surface of the body 12. Accordingly, all such embodiments are recognized and anticipated. It is, however, noted that the construction of the air outlet means 16 in a particular embodiment of the device 10 does not have to identically match the construction of the air inlet means 14 in that same embodiment. The construction of each of the air inlet means 14 and the air outlet means 16 may be similar or it may be different, and it is recognized that the construction thereof will typically vary from one embodiment to another.

Figure 2:
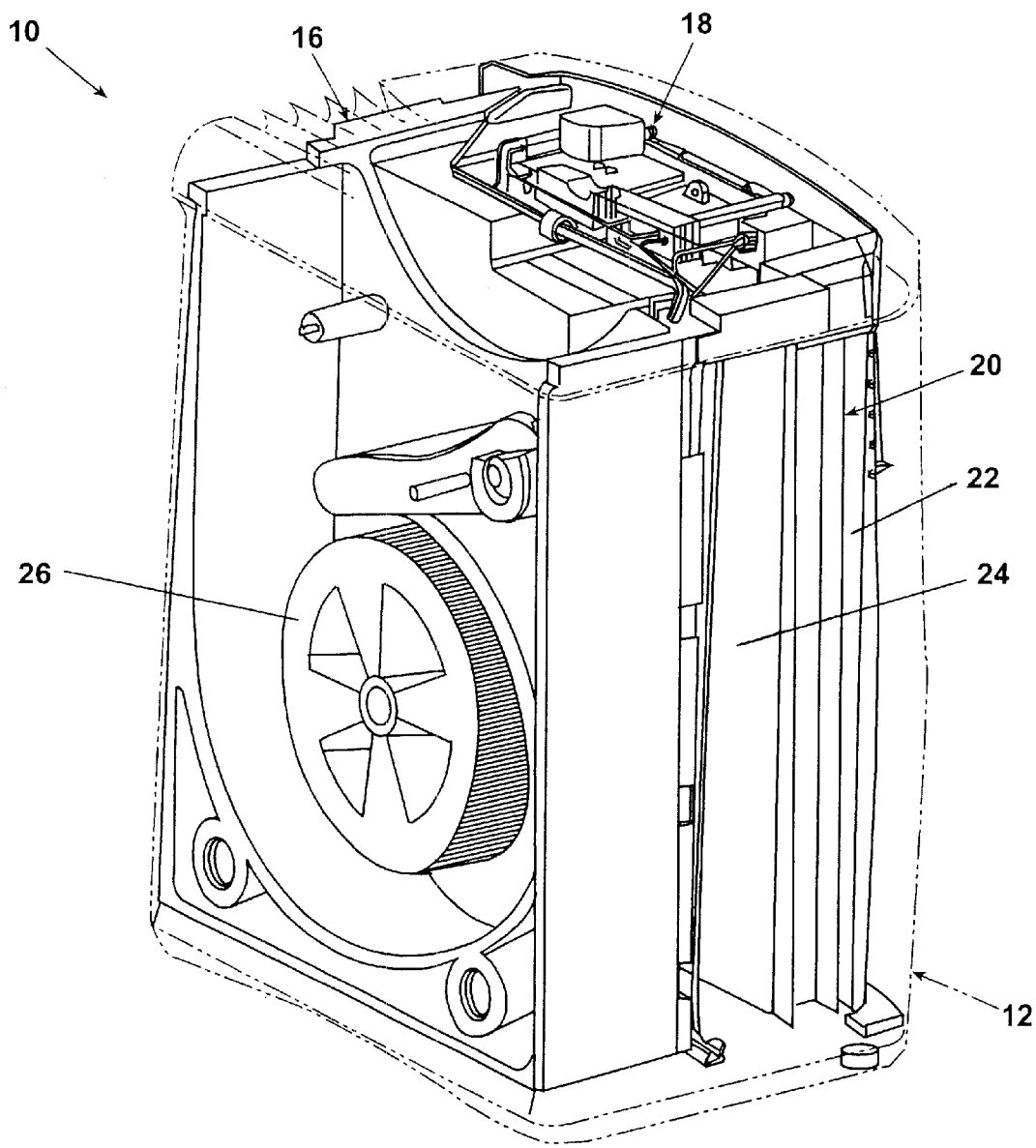
FIG. 2 is a rear perspective view of the air purifying device of FIG. 1, wherein the components within the device are visible through a translucent exterior body of the device.

Referring to FIG. 2, a perspective view of the air purifying device 10 of FIG. 1 from the rear is shown. The body 12 of the device 10 is constructed of a translucent material, whereby the components of the device 10 in the interior of the body 12 are at least partially visible from the exterior of the device 10. The term translucent material as used herein is intended to mean having the property of permitting at least limited visibility through the material. That is, the translucent material may be clear or transparent or it may be somewhat cloudy or may include particles of opaque materials such as flecks or strings, etc., while still permitting some visibility. The material may be colorless or it may be colored. The translucent material may be any such material known in the art, such as a plastic translucent material, which is see-through but yet sufficiently durable for the construction of a sturdy air purifying device 10.

It is recognized that the entire body 12 does not have to be constructed of the translucent material. Typically, only the areas of interest, such as those providing visual access to the filter mechanism 20 and/or the fan 26, need be constructed of the translucent material. However, other portions of the body 12 may also be constructed of the translucent material in other embodiments of the present invention.

The translucent material of the body 12 in one embodiment is a colorless material, but it is recognized and anticipated that the translucent material may be of any aesthetically appealing color in other embodiments of the present invention. For example, the translucent material may be blue, red, green, yellow, orange, pink, or the like. Further, it is recognized and anticipated that the translucent material of the body 12 may also include a mixture of colors in other embodiments of the present invention. For example, the air inlet means 14 may be constructed of one color of translucent material, such as red, the air outlet means 16 may be constructed of another color of translucent material, such as blue, while the remainder of the body 12 may be constructed of a different color of translucent material, such as clear or yellow. In another embodiment, two or more separable components of the external body 12 of the device 10 can each be of a different color. Accordingly, an infinite number of such permutations and combinations of colors is possible, and all such embodiments that do not depart from the spirit and scope of the present invention are recognized and anticipated.

As shown in FIG. 2, a filter mechanism 20 inside the device 10 may be visible from the exterior of the device 10 by virtue of the see-through properties of the translucent material that the body 12 is constructed of. The filter mechanism 20 preferably includes a pre-filter 22 and a HEPA filter 24, although it is recognized and anticipated that any type of filter mechanism usable in the art may be utilized in the device 10. Irrespective of the type of the filter mechanism 20 utilized, it may be appreciated that the condition thereof will be visible from the exterior of the device when the portion of the body 12 overlying the filter mechanism 20 is translucent. Accordingly, a user may conveniently inspect the filter mechanism 20 visually at anytime and determine whether the filter mechanism 20 needs to be cleaned or replaced. Further, it may be appreciated that such visual inspection is non-intrusive, i.e., the user need not come in physical contact with the device 10. Also, such inspection may be performed at any time, whether during operation of the device 10 or while the device is switched off.

Referring to FIG. 2, it may also be appreciated that the internal components, including moving parts, in the air purifying device 10 may also be inspected from the exterior of the device 10 when the portion of the body 12 overlying such parts is translucent. For example, the fan 26 inside the device 10 can be conveniently inspected visually by the user at any time. Such inspection, once again, is non-intrusive, and can be performed while the device is operating or while the device is switched off. Accordingly, a user may conveniently determine when the moving parts inside the device 10 need to be cleaned, etc.

It will also be appreciated that a user will be able to determine whether the device 10 is in operation or at rest at any time by a convenient non-intrusive visual inspection of the device. If the moving parts within the device 10 are in motion, it would indicate that the device is currently in operation. On the other hand, if the moving parts are at rest, it would indicate that the device is currently not in operation. Accordingly, a separate indicator, such as a light, to indicate whether the device 10 is currently operating is unnecessary. Eliminating such visual indicator lowers the cost of production of the device 10, and it helps lower the power consumption thereof during operation. However, it is recognized and anticipated that such a visual indicator, such as a light or an LED, may be provided in an alternate embodiment of the present invention.

It will be appreciated that the device 10 has additional aesthetic appeal because the internal components of the device 10 are visible from the exterior. This includes the moving parts therein, such as the fan 26, as well as the stationary parts therein, such as the electrical and/or electronic circuitry. The device 10, therefore, has additional appeal for users that are attracted to such aesthetic qualities in a device.

It is also recognized and anticipated that given the translucent body construction of the device 10, other functional and/or non-functional features may be added thereto to increase the aesthetic appeal thereof For example, additional lights, wiring and/or circuitry may be provided inside the device 10, or other features having mechanical motion may be provided, such as providing moving air inlet means 14 and/or moving air outlet means 16. It is recognized and anticipated that such additional features shall usually further contribute to the aesthetic appeal of the device 10 to users. Accordingly, all such embodiments that do not depart from the spirit and scope of the present invention are recognized and anticipated, and it is intended that all such embodiments shall be covered by the claims.

Hence, the present invention provides for an air treatment appliance having an external body at least partially constructed of a translucent material and having an internal component having a condition capable of visibly changing during an operation of the appliance wherein the condition of the internal component, such as a movable member like a fan, or a filter mechanism subject to visibly filling with filtered material, is visible from the exterior of the external body through the translucent material.

As is evident from the foregoing description, certain aspects of the present invention are not limited to the particular details of the examples illustrated herein, and it is therefore contemplated that other modifications and applications will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

The embodiments of the invention in which an exclusive property or privilege is claimed are defined as follows:

1. An air treatment appliance for filtering out undesirable material from surrounding air, comprising:
   an external body forming a housing for said appliance at least partially constructed of a translucent material, said external body comprising of at least two separable components operatively connected together;
   an air inlet in said external body;
   an air outlet in said external body, said air outlet spaced apart from said air inlet;
   a fan inside said external body, said fan operable to draw in air through said air inlet and to expel the air through said air outlet;
   an electrical control on said external body, said electrical control operable to at least partially control the operation of the air treatment appliance; and
   a filter mechanism removably mounted inside said housing and accessible for servicing when said at least two separable components are separated, wherein
      said air drawn in by said fan through said air inlet passes through said filter mechanism before being expelled through said air outlet, and
      said filter mechanism and at least a portion of an interior of the air treatment appliance are visible from an exterior of the device through said translucent material of said external body whereby a user can determine if said filter mechanism needs to be serviced without disconnecting said two separable components to open said housing to inspect said filter mechanism.

2. The air treatment appliance of claim 1 wherein said translucent material is clear.

3. The air treatment appliance of claim 1 wherein said translucent material is cloudy.

4. The air treatment appliance of claim 1 wherein said translucent material includes flecks of an opaque material.

5. The air treatment appliance of claim 1 wherein said translucent material is colored.

6. The air treatment appliance of claim 5 wherein said colored translucent material is at least one of blue, green, red, orange, yellow and pink.

7. The air treatment appliance of claim 5 wherein said translucent material includes at least two different colors corresponding to said at least two separable components of said external body of the air purifying device.

8. The air treatment appliance of claim 5 wherein said air inlet in said external body of the device has a different color than said air outlet.

9. The air treatment appliance of claim 2 wherein said fan is also visible from an exterior of the device through said translucent material of said external body.

\* \* \* \* \*